(12) United States Patent
Kharkar et al.

(10) Patent No.: US 9,795,881 B2
(45) Date of Patent: Oct. 24, 2017

(54) CONTROLLING GROUPS OF GAME ENTITIES IN A VIDEO GAME IN A COLLECTIVE, COORDINATED, AND/OR COLLABORATIVE MANNER USING A GROUP ENTITY

(71) Applicant: Disney Enterprises, Inc., Burbank, CA (US)

(72) Inventors: Sandeep Kharkar, Bountiful, UT (US); Daren Smith, Kaysville, UT (US); Jason Scanlon, Clearfield, UT (US); Duane Johnson, Grantsville, UT (US); Paul Mombourquette, Sandy, UT (US)

(73) Assignee: Disney Enterprises, Inc., Burbank, CA (US)

( * ) Notice: Subject to any disclaimer, the term of this patent is extended or adjusted under 35 U.S.C. 154(b) by 416 days.

(21) Appl. No.: 14/524,903

(22) Filed: Oct. 27, 2014

(65) Prior Publication Data

US 2016/0114248 A1 Apr. 28, 2016

(51) Int. Cl.
*A63F 13/56* (2014.01)
*A63F 13/573* (2014.01)

(52) U.S. Cl.
CPC ............ *A63F 13/56* (2014.09); *A63F 13/573* (2014.09)

(58) Field of Classification Search
CPC .............................. A63F 13/56; A63F 13/573
See application file for complete search history.

(56) References Cited

U.S. PATENT DOCUMENTS

| | | | | |
|---|---|---|---|---|
| 6,736,724 | B1* | 5/2004 | Erikawa | A63F 13/10 463/1 |
| 6,859,207 | B2* | 2/2005 | Nougaret | G06T 13/00 345/474 |
| 7,785,198 | B2* | 8/2010 | Kando | A63F 13/10 345/473 |
| 8,556,694 | B2* | 10/2013 | Watanabe | A63F 13/005 463/5 |
| 8,790,172 | B2* | 7/2014 | Yamada | A63F 13/10 463/1 |

(Continued)

OTHER PUBLICATIONS

Grouping Units, http://artho.com/age/groups.html, printed Feb. 6, 2017.*

(Continued)

*Primary Examiner* — Corbett B Coburn
(74) *Attorney, Agent, or Firm* — Sheppard Mullin Richter & Hampton LLP

(57) ABSTRACT

Systems and methods for controlling groups of game entities in a video game in a collective, coordinated, and/or collaborative manner are presented herein. Groups of individual game entities may be formed. Individual groups may be associated with a group entity. Control inputs may be received that are related to group entity actions to be performed by the group entities in the virtual space. The group entity actions may be related to one or more group actions to be performed by the game entities included in the groups in a collective, coordinated, and/or collaborative manner. The one or more group actions may be implemented by executing individual game entity actions to be performed by the individual game entities included in the groups. The individual game entity actions may be determined based on the group entity actions.

20 Claims, 4 Drawing Sheets

(56) References Cited

U.S. PATENT DOCUMENTS

| | | | |
|---|---|---|---|
| 8,790,178 B1* | 7/2014 | Fontaine | A63F 13/00 463/31 |
| 2001/0026265 A1* | 10/2001 | Kikuchi | A63F 13/10 345/157 |
| 2002/0045470 A1* | 4/2002 | Atsumi | A63F 13/10 463/1 |
| 2006/0135237 A1* | 6/2006 | Tsuda | A63F 13/10 463/9 |
| 2006/0246974 A1* | 11/2006 | Tsuda | A63F 13/10 463/7 |

OTHER PUBLICATIONS

Age of Empires II Users Manual, Microsoft Corporation, 1997-99, pp. 34-37 & 44-43.*
Age of Empires Wikipedia Article, https://en.wikipedia.org/wiki/Age_of_Empires, Printed Feb. 6, 2017.*

* cited by examiner

CONTROLLING GROUPS OF GAME ENTITIES IN A VIDEO GAME IN A COLLECTIVE, COORDINATED, AND/OR COLLABORATIVE MANNER USING A GROUP ENTITY

FIELD OF THE DISCLOSURE

This disclosure relates to controlling groups of game entities in a video game in a collective, coordinated, and/or collaborative manner using a group entity.

BACKGROUND

Video games may take place in a virtual space. In some implementations, a video game may be an online game. The virtual space may be hosted over a network, such as the internet, to client computing platforms associated with users of the video game. In some implementations, a virtual space may be hosted locally at the client computing platforms. For example, a client computing platform may be a gaming console (e.g, XBOX, PLAYSTATION, etc.). The virtual space may be provided to users through local hosting at the client computing platform. Information used to host the virtual space may be information that is local to the client computing platform (e.g., via a game disc, cartridge, memory card, etc.). These types of games may be referred to as console games. In some implementations, console games may represent an offline version of an online game.

User participation in a video game may include controlling game entities, groups of game entities, and/or other virtual objects in the virtual space. A game entity may be a virtual character that represents the user in the virtual space. In some implementations, game entities, groups of game entities, and/or other virtual objects in the virtual space may be controlled by artificial intelligence (AI) inputs.

SUMMARY

One or more aspects of the disclosure relates to a system for controlling groups of game entities in a video game in a collective, coordinated, and/or collaborative manner. In particular, one or more aspects of the disclosure relates to collectively coordinating and/or collaborating the actions of a group of game entities using a group entity that is associated with the group. In some implementations, the actions of the individual ones of the game entities included in the group may be determined and executed based on control inputs related to actions to be performed by the group entity associated with the group. By executing actions of individual ones of the game entities included in a group based on the control inputs related to actions of a single group entity associated with the group, substantially less computation effort may be required to carry out the actions of the individual ones of the game entities compared to executing actions of the individual ones of the game entities based on separate control inputs being received for the individual ones of the game entities.

In some implementations, the system may include one or more physical processors that are configured to execute one or more computer program components. The computer program components may include one or more of a space component, a group association component, a receiving component, an implementation component, and/or other components.

The space component may be configured to execute an instance of a video game. The space component may be configured to implement the instance of the video game to facilitate user participation in the video game that takes place in a virtual space. User participation in the video game may include controlling groups of game entities in the virtual space.

The group association component may be configured to form groups of individual game entities. The group association component may be configured to associate a group with a group entity. For example, a first group may be formed that includes a first game entity, a second game entity, and/or other game entities. The first group may be associated with a first group entity.

The receiving component may be configured to receive control inputs related to group entity actions to be performed by the group entities in the virtual space. The group entity actions may correspond to one or more group actions to be performed by the game entities included in the groups in the virtual space together. This may include execution of a group action by the game entities included in a group, in a collective, coordinated, and/or collaborative manner. For example, a first control input related to a first group entity action of the first group entity may be received. The first group entity action may correspond to a first group action to be performed by the first game entity, second game entity, and/or other game entities included in the first group in the virtual space in a collective, coordinated, and/or collaborative manner.

The implementation component may be configured to implement the corresponding one or more group actions to be performed by the game entities included in the groups through the execution of individual game entity actions to be performed by the individual game entities included in the group. In some implementations, the individual game entity actions may be determined based on the group entity actions. For example, implementing the first group action may include executing a first game entity action to be performed by the first game entity, a second game entity action to be performed by the second game entity, and/or other game entity actions to be performed by other game entities included in the first group. The first game entity action and/or the second game entity action may be determined based on the first group entity action.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
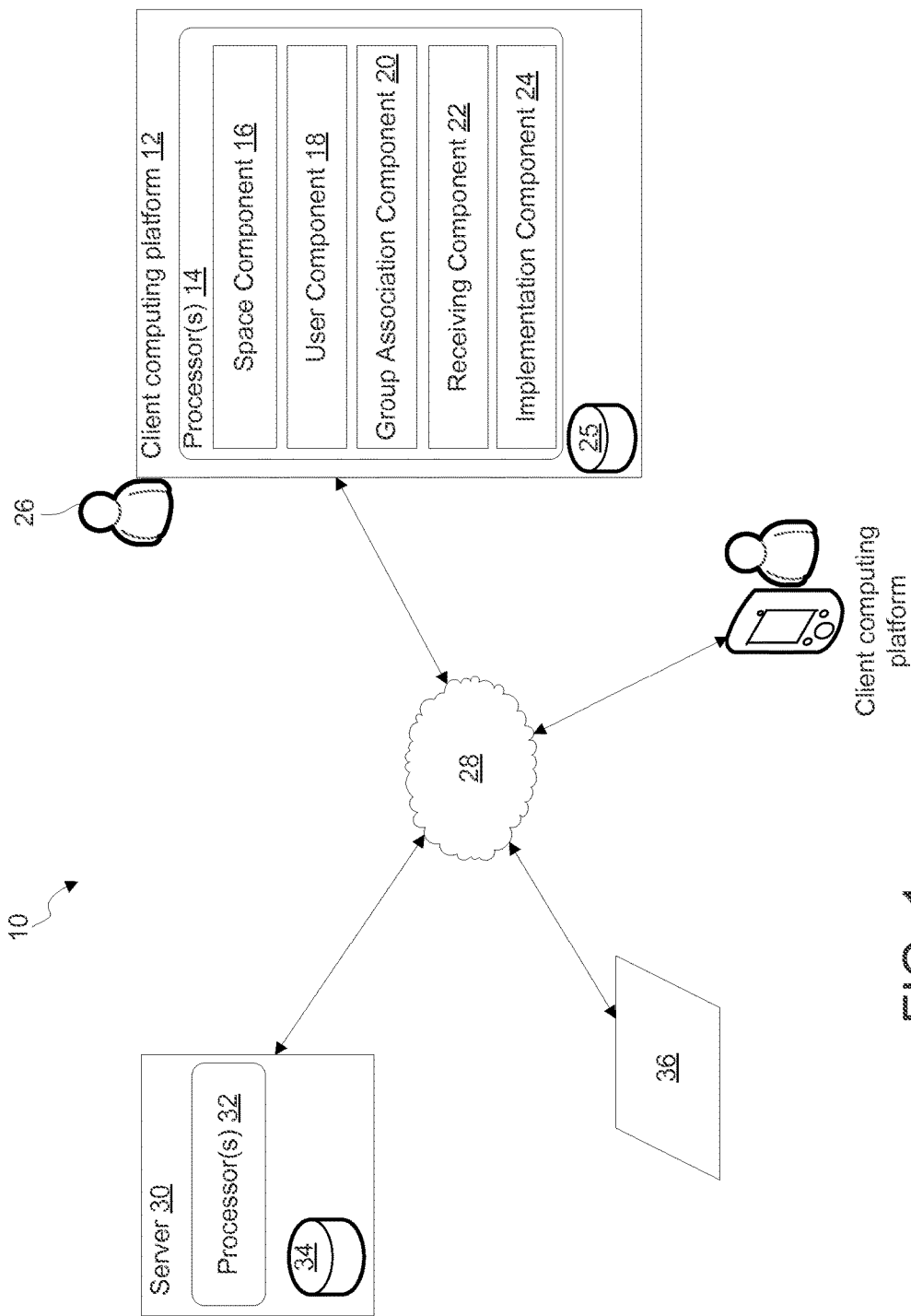
FIG. 1 illustrates an implementation of a system for controlling groups of game entities in a video game.

FIG. 1 illustrates a system 10 for controlling groups of game entities in a video game in a collective, coordinated, and/or collaborative manner, in accordance with one or more implementations. The video game may take place in a virtual space. In some implementations, the video game may be an online game. The video game (e.g., online game) may be hosted by a game server (e.g., server 30) over a network 28, such as the Internet. The video game may be accessed by users via client computing platforms, such as client computing platform 12.

In some implementations, the video game may be an "offline" version of the online game (e.g., facilitating offline gameplay). The video game may be a console game. The virtual space may be hosted locally on the client computing platforms associated with the users. For example, in some implementations, the virtual space may be hosted locally at client computing platform 12 associated with a user 26 and/or other users.

The client computing platforms may include, for example, a cellular telephone, a smartphone, a laptop, a tablet computer, a desktop computer, a television set-top box, smart TV, a gaming console, and/or other device suitable for the intended purpose(s) presented herein and/or other considerations.

A game entity may refer to a virtual object (or group of objects) present in the virtual space that represents an individual user. A game entity may be a virtual character (e.g., an avatar) and/or other virtual object. A group of game entities may include a group of virtual characters, virtual objects, and/or other considerations. In some implementations, a group of game entities may comprise a troop, a battalion, a clan, and/or other considerations.

One or more virtual objects included in the virtual space may include virtual items and/or virtual goods that are usable within the virtual space and/or the video game that takes place in the virtual space. Virtual items and/or goods may include one or more of a virtual weapon, a tool, a food, a currency, a reward, a bonus, health, a potion, an enhancement, a mount, a power-up, a speed-up, virtual clothing (e.g., shirt, hat, pants, etc.), a vehicle, an anatomical feature of a character and/or game entity, a troop or troop type, a pet, a virtual resource, and/or other considerations of virtual items and/or goods.

In some implementations, user participation in the video game and/or virtual space may include controlling groups of game entities in the virtual space (e.g., user controlled groups). Control may be provided by control inputs. The control inputs may be determined based on user entry and/or selection of the control inputs through the client computing platforms used to access the virtual space. For example, control inputs may include directional inputs for navigating the group through the virtual space, command inputs for attacks and/or other actions, and/or other considerations. Control inputs from users may be considered in other ways.

In some implementations, the control of groups of game entities in the virtual space may be automatically determined. For example, control inputs for controlling groups of game entities in the virtual space may be automatically determined based on artificial intelligence (AI) control inputs that are executed in the virtual space (e.g., AI controlled groups). AI control inputs may relate to routines and/or processes that are executed in the virtual space that drive gameplay in the virtual space. AI control inputs may include, without limitation, directional inputs for navigating AI controlled groups of game entities through the virtual space, command inputs for attacks and/or other actions of the AI controlled groups, and/or other considerations. AI control inputs may relate to routines and/or processes for controlling a game entity, a group of game entities, a virtual object, a group of virtual objects, topographical elements of the virtual space, simulated physical phenomena that occurs in the virtual space, and/or other considerations.

Users may participate in the video game by participating in gameplay events that take place in the virtual space. Gameplay events may include one or more of a tournament, a match, a campaign, a battle, a war, co-play, and/or other considerations of gameplay in the video game and/or virtual space. Users may control groups of game entities during participation in the gameplay events. For example, a gameplay event may include users controlling groups of game entities to battle other users that control groups of game entities, and/or other considerations. Users may encounter AI controlled groups of game entities during participation in the gameplay events. For example, a gameplay event may include users controlling groups of game entities to battle AI controlled groups of game entities, and/or other considerations. Gameplay events and/or control of groups of game entities in the virtual space may be considered in other ways.

In some implementations, a group of game entities may be associated with a group entity. A group entity may be a virtual object present in the virtual space. In some implementations, the control of groups of game entities may be facilitated by control inputs that are related to group entity actions to be performed by the group entities that are associated with the groups. The group entity actions may correspond to one or more group actions to be performed by the game entities included in the groups in a collective, coordinated, and/or collaborative manner. The group actions may be implemented by executing individual game entity actions to be performed by the individual game entities included in a group. In this sense, the actions of the group entity may be "connected" to the individual ones of the associated game entities.

The group entity actions performed by the group entities associated with a group may be used to control, restrict, constrain, dictate, and/or otherwise determine the individual game entity actions that may be performed by individual ones of the game entities included in the group. The determination of the individual game entity actions of the game entities included in the groups may be based on predetermined constraints that are associated with the group and/or individual ones of the game entities. The predetermined constraints may be constraints on the individual game entity actions of the game entities included in a group with respect to the group entity actions of the group entity associated with the group, and/or other considerations. That is to say, in some implementations, the actions of the individual game entities may not be effectuated through implementation of separate and distinct of programming instructions (e.g., code) for each game entity, but may effectuated via the programming instructions and/or logic associated with the group entity and/or through logical relationships that extend from these instructions to the individual ones of the game entities.

By way of non-limiting illustration, consider an alternative technique for controlling the actions of individual game entities included in a group absent the controls effectuated through the use of a group entity as presented herein. In accordance with such techniques, the actions of the individual ones of the game entities may be determined by separate and distinct programming instructions and/or logic for each game entity included in the game code. In order for a group of game entities to "appear" within the virtual space as a collective, coordinated, and/or collaborative group, additional programming instructions and/or logic may have to be implemented in order for the actions of the game entities to be "connected" to one another. For example, programming algorithms such as bold-like movement algorithms may have to be implemented (e.g., using concepts of cohesion, separation, group direction, and/or other considerations). One may quickly ascertain that such implementations may require substantial use of the limited pools of memory and/or CPU due to the extensive mathematical algorithms and/or other programming instructions associated with implementing this type of control. Other solutions may include limiting the number of game entities within the group, and/or limiting the awareness and responsiveness of the game entities to other game entities, which may however take away from the user's gameplay experience as well as the overall objective of achieving collective, coordinated, and/or collaborative movement of the game entities. One or more implementations of the system 10 presented herein, may provide techniques for control of groups of game entities in which these and/or other obstacles may be overcome.

In some implementations, the predetermined constraints may be related to one or more of a speed of an individual game entity with respect to a speed of the group entity, a spacing between an individual game entity and the group entity, a spacing between the individual game entities themselves (e.g., collision constraints), maintaining a predetermined number of game entities to be included in the group, a manner in which an individual game entity responds to AI controlled elements of the virtual space, a manner in which an individual game entity responds to the topography of the virtual space, and/or other considerations. One or more additional descriptions of predetermined constraints are provided in more detail herein.

In some implementations, a group action may correspond to navigating the game entities included in a group through the topography of the virtual space in a collective, coordinated, and/or collaborative manner. The paths by which the game entities follow may be determined based on control inputs related to a group entity action of a group entity associated with the group (e.g., user control inputs and/or AI control inputs). The group entity action may correspond to navigating the group entity through the virtual space along a path. The paths by which the individual ones of the game entities of the group follow may be determined based on predetermined constraints related to the navigation of the individual ones of the game entities with respect to the navigation of the group entity. In this sense, the paths of the individual game entities included in the groups may change depending on the predetermined constraints and/or other factors as the group entity is navigated through the virtual space. The predetermined constraints may allow for collective, coordinated, and/or collaborative movement of the game entities included in the groups through the virtual space. As an illustrative example, a location in the virtual space of the individual ones of the game entities included in a group may correspond to a path by which the individual ones of the game entities are following. The location of the game entities may be changed, altered, and/or otherwise determined based on the predetermined constraints and/or other factors.

In FIG. 1, in some implementations, providing the virtual space may include hosting the virtual space on client computing platforms. The virtual space may be hosted on client computing platform 12. Briefly, although the following description is directed towards client computing platform 12, it is to be understood that the client computing platforms in general may be similarly configured and/or may include the same or similar components in order to carry out the same or similar functions and/or features attributed to client computing platform 12 as presented herein.

In some implementations, client computing platform 12 may be a gaming console and/or other type of client computing platform. Client computing platform 12 may be configured to execute an instance of the virtual space and/or video game taking place in the virtual space by using information stored by and/or local to client computing platform 12 (e.g., a game cartridge, game disk, memory card/stick, USB memory stick, electronic storage, and/or other considerations) and/or other information. In some implementations, client computing platform 12 may be configured to execute an instance of the virtual space and/or video game using information received from server 30.

Client computing platform 12 may include one or more processors 14 configured to execute one or more computer components for implementing the instance of the virtual space and/or a video game taking place within the virtual space and to facilitate the participation of user 26 and/or other users in the virtual space and/or the video game. The computer program components of client computing platform 12 may include one or more of a space component 16, a user component 18, a group association component 20, a receiving component 22, an implementation component 24, and/or other components. In some implementations, client computing platform 12 may be configured to communicate with server 30, for example, over network 28.

In some implementations, some or all of the functionality of client computing platform 12 may be attributed to server 30. In such implementations, providing the virtual space may include hosting the virtual space over the network 28. The server 30 may include one or more processors 32 configured to execute the one or more computer components for implementing an instance of the virtual space and/or a video game taking place within the virtual space and to facilitate the participation of one or more users in the virtual space and/or the video game (e.g., online game). Processors 32 may include the same or similar components as presented for client computing platform 12, and/or other considerations. The users may access server 30 and/or the virtual space via client computing platforms. Server 30 may include electronic storage 34.

The some implementations of online gameplay and/or other gameplay, server 30 may be configured to determine state of the virtual space. The state may then be communicated (e.g., via streaming visual data, via object/position data, and/or other state information) from server 30 to client computing platform 12 and/or other client computing platforms for presentation to user 26 and/or other users. Server 30 may be attributed with more or less functionality described herein for client computing platform 12 in order for server 30 to execute an instance of the virtual space and/or video game as presented herein.

Referring back to client computing platform 12, the space component 16 may be configured to execute and implement an instance of the virtual space. The instance of the virtual space may be executed by the computer components to determine state of the virtual space. The state determined and presented by client computing platform 12 may correspond to a location in the virtual space (e.g., location in the game). The view described by the state may correspond, for example, to the location from which the view is taken, the location the view depicts, and/or other locations, a zoom ratio, a dimensionality of objects, a point-of-view, and/or view parameters of the view. One or more of the view parameters may be selectable by user 26.

An instance of the virtual space may comprise a simulated space that is accessible by user 26 and/or other users via a client (e.g., client computing platform 12 and/or other client computing platforms) that presents the views of the virtual space to user 26 and/or other users. The simulated space may have a topography, express ongoing real-time interaction by one or more users, and/or include one or more objects positioned within the topography that are capable of locomotion within the topography. In some instances, the topography may be a 2-dimensional topography. In other instances, the topography may be a 3-dimensional topography. The topography may include dimensions of the space, and/or surface features of a surface or objects that are "native" to the space. In some instances, the topography may describe a surface (e.g., a ground surface) that runs through at least a substantial portion of the space (e.g., comprising at least part of a virtual terrain). In some instances, the topography may describe a volume with one or more bodies positioned therein (e.g., a simulation of gravity-deprived space with one or more celestial bodies positioned therein). An instance executed by the computer components may be synchronous, asynchronous, and/or semi-synchronous.

The above description of the manner in which state of the virtual space is determined by space component 16 is not intended to be limiting. The space component 16 may be configured to express the virtual space in a more limited, or richer, manner. For example, views determined for the virtual space representing the state of the instance of the virtual space may be selected from a limited set of graphics depicting an event in a given place within the virtual space. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other expressions of individual places within the virtual space are contemplated.

Within the instance(s) of the virtual space executed by space component 16, user 26 may control game entities, groups of game entities, simulated physical phenomena (e.g., wind, rain, earthquakes, and/or other phenomena), and/or other elements within the virtual space to interact with the virtual space and/or other users. The game entities may include virtual characters, such as avatars, group entities, and/or other considerations. A given game entity and/or group of game entities may be controlled by user 26 with which it is associated. User 26 may control a group of game entities through control of a group entity that is associated with the group. The user controlled element(s) may move through and interact with the virtual space (e.g., non-user characters in the virtual space, other objects in the virtual space). The user controlled elements controlled by and/or associated with user 26 may be created and/or customized by user 26, based on information received by client computing platform 12 (e.g., from server 30), and/or may be based on other information. User 26 may have an "inventory" of virtual items, game entities, and/or currency that user 26 can use (e.g., by manipulation of a virtual character or other user controlled element, and/or other items) within the virtual space.

User 26 and/or other users may participate in the instance of the virtual space by controlling one or more of the available user controlled game entities in the virtual space. Control may be exercised through control inputs such as entry, selection, and/or commands input by user 26 and/or other users through client computing platform 12 and/or other client computing platforms. Other users may interact with user 26 through communications exchanged within the virtual space. Such communications may include one or more of textual chat, instant messages, private messages, voice communications, and/or other communications. Communications may be received and entered by the users via their respective client computing platforms. Communications may be routed to and from the appropriate users through network 28 and/or through communications which are external to the system 10 (e.g., text messaging services associated with the users).

The instance of the virtual space and/or the online game that takes place therein may be persistent. That is, the virtual space and/or the game may continue on whether or not individual players are currently logged in and/or participating in the game. A player that logs out of the virtual space and then logs back in some time later may find the virtual space has been changed through the interactions of other players with the virtual space during the time the player was logged out. These changes may include changes to the simulated physical space, changes in the player's inventory, changes in other player's inventories, changes experienced by non-player characters, changes to the virtual items available for use in the online game, and/or other changes.

In FIG. 1, the user component 18 may be configured to access and/or manage one or more user profiles, user information, and/or user accounts associated with user 26 and/or other users. The one or more user profiles and/or user information may include information stored locally to client computing platform 12, by server 30, one or more other client computing platforms, and/or other storage locations. The user profiles may include, for example, information identifying users (e.g., a username or handle, a number, an identifier, and/or other identifying information) within the virtual space, security login information (e.g., a login code or password), virtual space account information, subscription information, virtual (or real) currency account information (e.g., related to currency held in credit for a user), control input information (e.g., a history of control inputs provided by the user), virtual inventory information (e.g., virtual inventories associated with the users that include one or more virtual items available for the users in the virtual space and/or game entities available to the user for use in a group of game entities in the virtual space), relationship information (e.g., information related to relationships between users in the virtual space), virtual space usage information (e.g., a log-in history indicating the frequency and/or amount of times the user logs-in to the user accounts), demographic information associated with users, interaction history among users in the virtual space, information stated by users, browsing history of users, a client computing platform identification associated with a user, a phone number associated with a user, and/or other information related to users.

The group association component 20 may be configured to form groups of individual game entities. In some implementations, the group association component 20 may be configured to form groups of game entities based on user control inputs. In some implementations, the group association component 20 may be configured to form groups of game entities automatically. In some implementations, a group of game entities may be restricted to a predetermined amount of game entities that may be included in the group and/or may be restricted in other ways.

In some implementations, the group association component 20 may be configured to form a group of game entities based on user control inputs. As an illustrative example, a gameplay event may include users (e.g., user 26) controlling groups of game entities in the virtual space (e.g., a multiplayer battle and/or others considerations). Users may input commands (e.g., control inputs) for deploying and/or otherwise introducing game entities individually into the virtual space (e.g., a battle arena). Once the game entities are deployed, the group association component 20 may be configured to form a group that includes the deployed game entities.

As another illustrative example, users may control groups of game entities in the virtual space. In a gameplay event such as a battle, one or more game entities included in a group may be defeated (e.g., killed off). In some implementations, the group association component 20 may be configured to add new game entities to the group (e.g., to form a new group) based on user control inputs for adding new game entities to the group. For example, adding new game entities to a group may include spawning the new game entities into the virtual space. Forming groups of game entities based on user control inputs may be considered in other ways.

In some implementations, the group association component 20 may be configured to form groups of game entities automatically. For example, in a gameplay event, the group association component 20 may be configured to automatically form a group of game entities prior to and/or during the gameplay event. In some implementations, the group association component 20 may be configured to automatically add new game entities to a group based on the group maintaining a predetermined amount of game entities. As another example, during a gameplay event such as a battle, a user may encounter an AI controlled group of game entities. The user may defeat one or more individual game entities included in the AI controlled group. The group association component 20 may be configured to automatically add (or remove) game entities to the AI controlled group (e.g., up to a predetermined amount and/or other considerations). Forming groups of game entities automatically may be considered in other ways.

The group association component 20 may be configured to associate the individual groups with a group entity. In some implementations, a group of game entities may be associated with one group entity. In some implementations, a group of game entities may be associated with more than one group entity.

Figure 2:
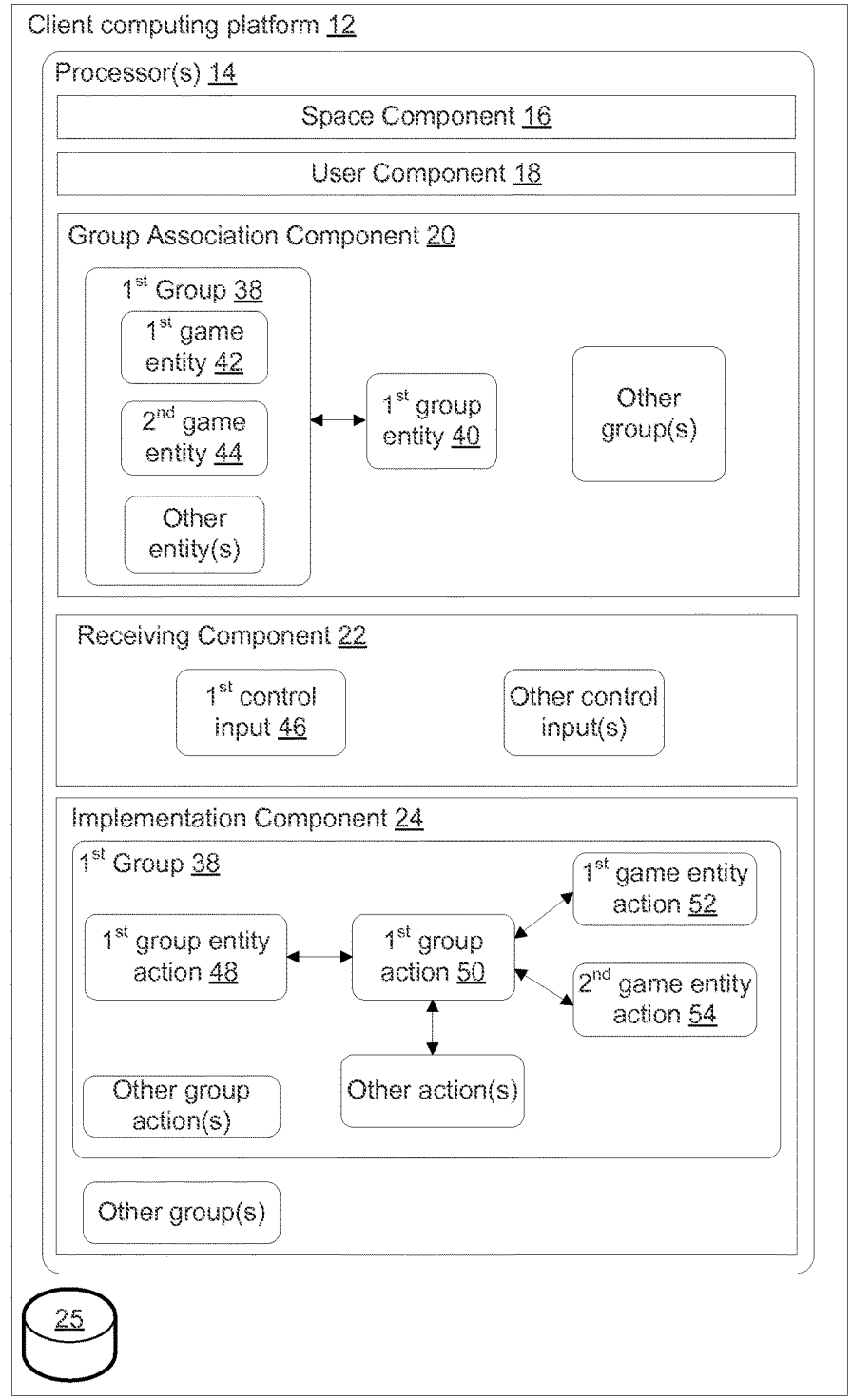
FIG. 2 illustrates an implementation of computing platform used in the system of FIG. 1.

As an illustrative example in FIG. 2, the group association component 20 may be configured to form a first group 38 and/or other groups. The first group 38 may include a first game entity 42, a second game entity 44, and/or other game entities. The group association component 20 may be configured to associate the first group 38 with a first group entity 40.

Returning to FIG. 1, the receiving component 22 may be configured to receive control inputs related to group entity actions to be performed by the group entities associated with the groups. The group entity actions may correspond to one or more group actions to be performed by the game entities included in the groups in a collective, coordinated, and/or collaborative manner. As presented herein, the group actions may be implemented by executing individual game entity actions to be performed by the individual game entities included in the groups. The individual game entity actions may be determined based on the group entity actions (e.g., based on one or more predetermined constraints).

In some implementations, the received control inputs may be determined automatically (e.g., via AI control inputs) as presented herein and/or other considerations. In some implementations, the control inputs may be determined based on entry and/or selection from users through client computing platforms used to access the virtual space as presented herein and/or other considerations. For example, entry and/or selection from user 26 via client computing platform 12 may comprise at least some of the control inputs that are received by the receiving component 22.

As an illustrative example in FIG. 2, the receiving component 22 may be configured to receive a first control input 46. The first control input 46 may be related to a first group entity action 48 and/or other group entity action to be performed by the first group entity 40 in the virtual space. The first group entity action 48 may correspond to a first group action 50 and/or other group action to be performed by the game entities included in the first group 38 in the virtual space in a collective, coordinated, and/or collaborative manner (e.g., the first game entity 42 and second game entity 44). In some implementations, the first control input 46 may be determined based on entry and/or selection from a first user (e.g., user 26 in FIG. 1) through a first client computing platform (e.g., client computing platform 12). In some implementations, the first control input 46 may be determined automatically. For example the first control input 46 may be determined automatically based on an AI control input.

Returning to FIG. 1, the implementation component 24 may be configured to implement the corresponding one or more group actions to be performed by the game entities included in the groups through the execution of individual game entity actions to be performed by the individual game entities included in the groups. The individual game entity actions of the individual game entities included in the groups may be determined based on the group entity actions of the group entities associated with the groups. The determination of the individual game entity actions may be based on one or more predetermined constraints with respect to the group entity actions. For example, received control inputs may be related to navigation of a group entity associated with a group through the virtual space. Individual game entity actions may include navigating the game entities included in the group through the virtual space. The individual game entity actions may be determined such that the individual game entities "follow" the group entity. The individual game entity actions may be determined based on one or more predetermined constraints on the navigation of the game entities with respect to the navigation of the group entity.

In some implementations, predetermined constraints may relate to one or more of a speed of an individual game entities with respect to a speed of the group entity, a spacing between an individual game entity and the group entity, a spacing between the individual game entities themselves (e.g., collision constraints), maintaining a predetermined amount of game entities in a group, a manner in which the individual game entities respond to AI controlled elements of the virtual space, a manner in which the individual game entities respond to the topography of the virtual space, and/or other considerations.

A constraint related to the speed of an individual game entities with respect to the speed of the group entity may be considered in a variety of ways. The speed of the group entity associated with a group may be determined based on the received control inputs related to a group entity action of the group entity. In some implementations, the group may be associated with a predetermined constraint, which dictates, for example, that an individual game entity included in the group moves through the virtual space at the same speed as the group entity associated with the group. In some implementations, a predetermined constraint may dictate that an individual game entity included in the group moves faster than the group entity associated with the group. In some implementations, a predetermined constraint may dictate that an individual game entity included in the group moves slower than the game entity associated with the group. In some implementations, a predetermined constraint may dictate that an individual game entity included in the group varies the speed at which it moves through the virtual space. In some implementations, the speed at which individual game entities move through the virtual space may be determined based on predetermined threshold speeds. Predetermined constraints related to the speed of individual game entities included in a group may be considered in other ways.

A constraint related to the spacing between the individual game entities included in a group and the group entity associated with the group may be considered in a variety of ways. In some implementations, a group may be associated with a predetermined constraint, which dictates, for example, that the location of an individual game entity in the group is spaced a predetermined distance from the group entity associated with the group. In some implementations, a predetermined constraint may dictate that the location of an individual game entity included in the group is spaced from the group entity associated with the group a distance that does not breach a threshold. For example, an individual game entity may be allowed to stray from the group entity up to a predetermined distance and no farther, and/or other considerations. Predetermined constraints related to the spacing between individual game entities and the group entities may be considered in other ways.

A constraint related to the spacing between individual game entities included in a group may be considered in a variety of ways. The spacing between individual game entities included in a group may be considered a type of collision constraint (e.g., including collision detection, collision resolution, and/or collision aversion). In some implementations, a group may be associated with a predetermined constraint, which dictates, for example, that the spacing between any two individual game entities included in the group maintains a predetermined distance. This may mean that any two game entities included in the group may always be the same distance apart and therefor do not collide (e.g., collision aversion). In some implementations, a predetermined constraint may dictate that the spacing between any two individual game entities included in the group does not breach a threshold minimum distance. This may mean that any two game entities included in the group may vary their separation distance, however, should the game entities come within the threshold minimum distance (e.g., collision detection), the game entities may be restricted from coming any closer (e.g., collision resolution). In some implementations, a predetermined constraint may dictate that the spacing between any two individual game entities included in a group does not breach a threshold maximum distance. Predetermined constraints related to the spacing between individual game entities included in a group may be considered in other ways.

A constraint related to maintaining a predetermined amount of game entities in a group may be considered in a variety of ways. In some implementations, a group may be associated with a predetermined constraint, which dictates, for example, that the group always maintains a predetermined amount of game entities. For example, if one or more game entities are defeated, then one or more new game entities may be automatically added to the group (e.g., via group association component 20). Predetermined constraints related to the amount of individual game entities to be included in a group may be considered in other ways.

A constraint related to the manner in which the individual game entities included in a group respond to AI controlled elements of the virtual space and/or the topography of the virtual space may be considered in a variety of ways. AI controlled elements of the virtual space may include simulated physical phenomena in the virtual space, AI controlled game entities, AI controlled groups of game entities, and/or other AI controlled elements. The manner in which game entities included in a group respond to simulated physical phenomena may include, for example, losing heath and/or dying off (e.g., due to the simulated physical phenomena causing damage), changing locations in the virtual space (e.g., a simulated wind may blow a game entity from its current location), no response (nothing happens), and/or other considerations.

The manner in which game entities included in a group respond to AI controlled game entities and/or groups of game entities may include, for example, engaging the AI controlled game entities (e.g., in battle), ignoring the AI controlled game entities (do nothing), and/or other considerations.

The manner in which game entities included in a group respond to the topography may include, for example, avoiding topographical elements (e.g., change location in the virtual space to define a path that goes around a topographical element), and/or other considerations.

In some implementations, a group may be associated with one or more predetermined constraints as presented above and/or other considerations. In some implementations, the constraints may be dictated on an individual basis. For example, different game entities (e.g., different types of game entities) included in a group may be constrained by different ones of the predetermined constraints. Different types of game entities may include for example, a builder, a warrior, a leader, a villager, a trader, and/or other considerations. For example, a warrior type game entity included in a group may be constrained to respond differently to simulated physical phenomena then a villager type game entity included in the group. In some implementations, the predetermined constraints may be the same for all game entities included in a group. Predetermined constraints may be considered in other ways.

The above descriptions of the implementation of group actions through the determination and execution of individual game entity actions are provided for illustrative purposes only and are not to be considered limiting. The manner in which group actions are implemented and/or the game entity actions are determined and executed may be considered in other ways.

As an illustrative example in FIG. 2, the implementation component 24 may be configured to such that implementing the first group action 50 includes executing a first game entity action 52 to be performed by the first game entity 42, a second game entity action 54 to be performed by the second game entity 44, and/or other game entity actions to be performed by other game entities. In some implementations, the first game entity action 52 and/or the second game entity action 54 may be determined based on the first group entity action 50 (e.g., via one or more predetermined constraints as presented herein and/or other considerations).

Figure 3:
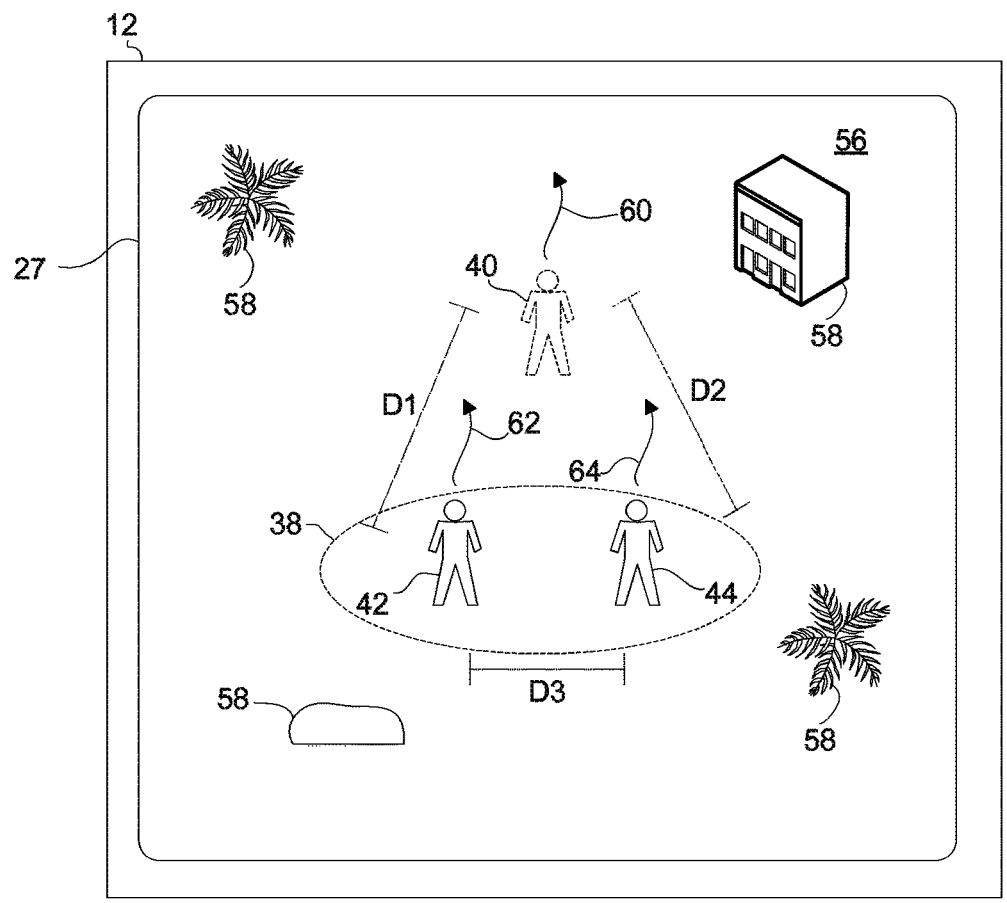
FIG. 3 illustrates a depiction of a group of game entities being controlled in the virtual space.

As a further illustrative example in FIG. 3, a depiction of the first group 38 being controlled in the virtual space 56 is illustrated. Views of the virtual space 56 may be displayed on a display 27 of client computing platform 12 (and/or other client computing platforms). The topography of the virtual space 56 may include topographical elements 58 (e.g., a tree, a bush, a rock, a building and/or other considerations).

The first group 38 may include the first game entity 42, the second game entity 44, and/or other game entities. The first group 38 may be associated with the first group entity 40. In some implementation, a control input may be received that is related to navigating the first group entity 40 along a first path 60 (e.g., the first group entity action). The first path 60 may be determined in real time and/or near real time based on the received control input. The first group entity action may correspond to a first group action. The first group action may correspond to navigating the first game entity 42 and the second game entity 44 along the first path 60 in a collective, coordinated, and/or collaborative manner.

Implementing the first group action may include executing a navigation of the first game entity 42 along a second path 62. Implementing the first group action 50 may include executing a navigation of the second game entity 44 along a third path 64. In some implementations, the first group action may be implemented by simultaneously executing the navigation of the first game entity 42 along a second path 62 and the second game entity 44 along a third path 64. In some implementations, the second path 62 and/or the third path 64 may be determined based on the first path 60 (e.g., via one or more constraints as presented herein and/or other considerations). As an illustrative example, a location of first game entity 42 defining the second path 62 and/or a location of the second game entity 44 defining the third path 64 may be determined based on collision constraints (e.g., maintaining threshold distances from the first group entity 40 and/or between each other).

In some implementations, the location of first game entity 42 defining the second path 62 and/or a location of the second game entity 44 defining the third path 64 may be determined based on respective threshold distances from a location of the first group entity 40 defining the first path 60. The location of first game entity 42 defining the second path 62 may be determined based on a first threshold distance, D1, from a location of the first group entity 40 along the first path 60. The location of the second game entity 44 defining the third path 64 may be determined based a second threshold distance, D2, from a location of the first group entity 40 along the first path 60.

In some implementations, a location of the first game entity 42 defining the second path 62 may be determined based on a third threshold distance, D3, from a location of the second game entity 44 defining the third path 64, and/or vis versa. Other constraints may be applied to the first game entity 42 and/or second game entity 44 based on the predetermined constraints associated with the first group 38 (e.g., related to avoiding topographical elements 58, AI controlled elements, and/or other considerations).

In some implementations, the group entities may be visible to the users such that the group entities represent virtual objects that are visible in the virtual space. In some implementations, the group entities may not be visible to the users such that the group entities represent virtual objects that are invisible in the virtual space. For example, the first group entity 40 may not be visible to user 26 and/or other users of client computing platform 12 (e.g., first group entity 40 is depicted by dashed lines representing that the first group entity 40 may be invisible to the user accessing the virtual space through client computing platform 12). In this manner, the users may be unaware of the group entities being present in the virtual space. As such, users may only be aware of the group actions performed by the game entities in a collective, coordinated, and/or collaborative manner. In implementations where control inputs are related to user control inputs, the users may be unaware that the control inputs they are providing are in fact related to the control for the group entities (since they cannot see them). The end result may simply be that the user views the game entities included in the groups moving directly in response to their control inputs, and not as a response to actions that are determined based on actions of the group entities.

Referring to FIG. 3, although first group entity 40 is shown in a leading position with respect to (e.g., in front of) the first game entity 42 and the second game entity 44, it is to be noted that in one or more other implementations, the group entities may be positioned in other locations with respect to the individual game entities. For example, the group entities may be positioned behind the collective group of game entities, to a side, in a middle area, in a center, and/or other locations with respect to the collective group of game entities.

Returning to FIG. 1, server 30, client computing platforms (e.g., client computing platform 12), and/or external resources 36 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server 30, client computing platforms, and/or external resources 36 may be operatively linked via some other communication media.

The external resources 36 may include sources of information that are outside of system 10, external entities participating with system 10, and/or other resources. In some implementations, some or all of the functionality attributed herein to external resources 36 may be provided by resources included in system 10.

Client computing platform 12 may include electronic storage 25, one or more processors 14, and/or other components. Client computing platform 12 may include communication lines, or ports to enable the exchange of information with a network, a server, and/or other client computing platforms. Illustration of client computing platform 12 in FIG. 1 is not intended to be limiting. Client computing platform 12 may include a plurality of hardware, software, and/or firmware components operating together to provide the functionality attributed herein to client computing platform 12.

Server 30 may include electronic storage 34, one or more processors 32, and/or other components. Server 30 may include communication lines, or ports to enable the exchange of information with a network and/or other computing platforms. Illustration of server 30 in FIG. 1 is not intended to be limiting. The server 30 may include a plurality of hardware, software, and/or firmware components operating together to provide the functionality attributed herein to server 30. For example, server 30 may be implemented by a cloud of computing platforms operating together as server 30.

Electronic storage (e.g., 25 and/or 34) may comprise electronic storage media that electronically stores information. The electronic storage media of the electronic storage may include one or both of storage that is provided integrally (i.e., substantially non-removable) with the respective device and/or removable storage that is removably connectable to the respective device. Removable storage may include for example, a port or a drive. A port may include a USB port, a firewire port, and/or other port. A drive may include a disk drive and/or other drive. Electronic storage may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage may include one or more virtual storage resources (e.g., cloud storage, a virtual private network, and/or other virtual storage resources). Electronic storage may store files, software algorithms, information determined by processor(s) and/or other information that enables the respective devices to function as described herein.

Processor(s) (e.g., 14 and/or 32) are configured to provide information processing capabilities in the respective device. As such, processors may include one or more of a digital processor, an analog processor, a digital circuit designed to process information, an analog circuit designed to process information, a state machine, and/or other mechanisms for electronically processing information. Although the processors are shown in FIG. 1 as single respective entities within the respective devices, this is for illustrative purposes only. In some implementations, the processors may include one or more processing units. These processing units may be physically located within the same device, or may represent processing functionality of a plurality of devices operating in coordination.

For example, processor 14 may be configured to execute components 16, 18, 20, 22, and 24. Processor 14 may be configured to execute components 16, 18, 20, 22, and 24 by software; hardware; firmware; some combination of software, hardware, and/or firmware; and/or other mechanisms for configuring processing capabilities on processor 14.

It should be appreciated that although components 16, 18, 20, 22, and 24 are illustrated in FIG. 1 as being co-located within a single processing unit, in implementations in which processor 14 includes multiple processing units, one or more of components 16, 18, 20, 22, and 24 may be located remotely from the other components. The description of the functionality provided by the different components 16, 18, 20, 22, and 24 described above is for illustrative purposes, and is not intended to be limiting, as any of components 16, 18, 20, 22, and 24 may provide more or less functionality than is described. For example, one or more of components 16, 18, 20, 22, and/or 24 may be eliminated, and some or all of its functionality may be provided by other ones of components 16, 18, 20, 22, 24, and/or other components. As another example, processor 14 may be configured to execute one or more additional components that may perform some or all of the functionality attributed to one or more of components 16, 18, 20, 22, and 24.

Figure 4:
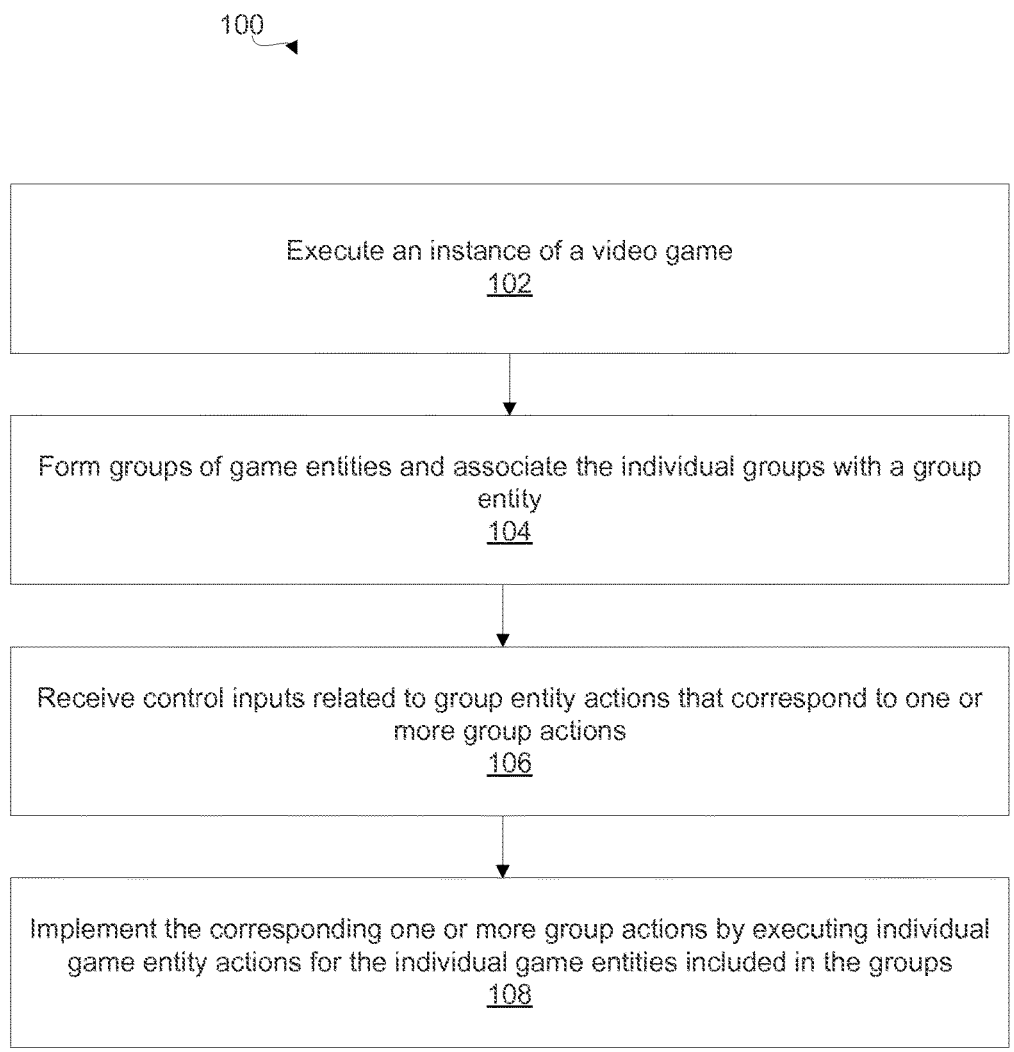
FIG. 4 illustrates an implementation of a method of controlling groups of game entities a video game.

FIG. 4 illustrates an implementation of a method 100 of controlling groups of game entities in a video game. The operations of method 100 presented below are intended to be illustrative. In some implementations, method 100 may be accomplished with one or more additional operations not described, and/or without one or more of the operations discussed. Additionally, the order in which the operations of method 100 are illustrated in FIG. 4 and described below are not intended to be limiting.

In some implementations, method 100 may be implemented in one or more processing devices (e.g., a client computing platform, a digital processor, an analog processor, a digital circuit designed to process information, an analog circuit designed to process information, a state machine, and/or other mechanisms for electronically processing information), and/or one or more other components. The one or more processing devices may include one or more devices executing some or all of the operations of method 100 in response to instructions stored electronically on an electronic storage medium. The one or more processing devices may include one or more devices configured through hardware, firmware, and/or software to be specifically designed for execution of one or more of the operations of method 100.

Referring now to method 100 in FIG. 4, at an operation 102 an instance of a video game may be executed. The instance of the video game may be implemented to facilitate user participation in the video game. The video game may take place in a virtual space. Users participation in the video game may include controlling groups of game entities in the virtual space. In some implementations, operation 102 may be performed by a space component the same as or similar to space component 16 (shown in FIG. 1 and described herein).

At an operation 104, groups of individual game entities may be formed. The groups of game entities may be associated with a group entity. For example a first group may be formed. The first group may include a first game entity, a second game entity, and/or other game entities. The first group may be associated with a first group entity. In some implementations, operation 104 may be performed by a group association component same or similar to group association component 20 (shown in FIG. 1 and described herein).

At an operation 106, control inputs related to group entity actions to be performed by the group entities in the virtual space may be received. The group entity actions may correspond to one or more group actions to be performed by the game entities included in the groups in the virtual space in a collective, coordinated, and/or collaborative manner. For example, a first control input may be received. The first control input may be related to a first group entity action to be performed by the first group entity. The first group entity action may correspond to a first group action to be performed by the game entities included in the first group. In some implementations, operation 106 may be performed by a receiving component same or similar to receiving component 22 (shown in FIG. 1 and described herein).

At an operation 108, the corresponding one or more group actions may be implemented. The one or more group actions may be implemented by executing individual game entity actions to be performed by the individual game entities included in the groups. The individual game entity actions may be determined based on the group entity actions. For example, implementing the first group action may include executing a first game entity action to be performed by the first game entity, a second game entity action to be performed by the second game entity, and/or other game entity actions. The first game entity action and/or the second game entity action may be determined based on the first group entity action. In some implementations, operation 108 may be performed by an implementation component same or similar to implementation component 24 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system to control groups of game entities in a video game, the system comprising:
one or more physical processors configured by computer-readable instruction to:
execute an instance of a video game, and implement the instance of the video game to facilitate user participation in the video game, the video game taking place in a virtual space, wherein user participation in the video game includes controlling groups of game entities in the virtual space;
form the groups of game entities and associate the individual groups with individual group entities, the individual game entities being discrete virtual objects within the virtual space, the individual group entities being discrete virtual objects within the virtual space that are separate and distinct from the individual game entities, the groups including a first group including a first game entity and a second game entity, wherein the first group is associated with a first group entity;
receive control inputs to directly control individual group entities, the control inputs causing the individual group entities to perform individual group entity actions in the virtual space in direct response to the control inputs, the individual group entity actions causing the game entities included in the corresponding groups to perform one or more group actions in a collective, coordinated, and/or collaborative manner in response to the corresponding individual group entity actions, such that:
receiving a first control input to directly control the first group entity causes the first group entity to perform a first group entity action in direct response to the first control input, and
the first group entity action causes the game entities included in the first group to perform a first group action in a first collective, coordinated, and/or collaborative manner in response to the first group entity action; and
implement the received control inputs by effectuating the individual group entity actions of the individual group entities and the individual group actions of the game entities included in the individual groups in the collective, coordinated, and/or collaborative manner, wherein effectuating the group actions of the game entities included in the individual groups in the collective, coordinated, and/or collaborative manner includes effectuating individual game entity actions to be performed by the individual game entities included in the corresponding individual groups in response to the corresponding individual group entity actions, such that implementing the first control input causes:
the first group entity to perform the first group entity action in response to the first control input; and
the game entities included in the first group to perform the first group action in the first collective, coordinated, and/or collaborative manner in response to the first group entity action by the first group entity;
wherein performing the first group action includes executing a first game entity action by the first game entity, and a second game entity action by the second game entity.

2. The system of claim 1, wherein the one or more physical processors are configured by computer-readable instructions such that the control inputs are determined based on entry and/or selection from users through client computing platforms used to access the virtual space, such that the first control input is determined based on entry and/or selection from a first user through a first client computing platform.

3. The system of claim 1, wherein the one or more physical processors are configured by computer-readable instructions such that the control inputs are determined automatically.

4. The system of claim 1, wherein the first game entity action and the second game entity action are responsive to the first group entity action.

5. The system of claim 1, wherein the one or more physical processors are configured by computer-readable instructions such that the one or more group actions include navigating the individual game entities included in the corresponding individual groups through the topography of the virtual space in a collective, coordinated, and/or collaborative manner, wherein the first group entity action corresponds to navigating the first group entity along a first path through the topography such that the first group action corresponds to navigating the first group along the first path in a collective, coordinated, and/or collaborative manner.

6. The system of claim 5, wherein the one or more physical processors are configured by computer-readable instructions such that implementing the first game entity action includes executing a navigation of the first game entity along a second path and the second game entity action includes executing a navigation of the second game entity along a third path, wherein the second path and third path are determined based on, and responsive to, the first path.

7. The system of claim 6, wherein the one or more physical processors are configured by computer-readable instructions such that a location of first game entity defining at least part of the second path and a location of the second game entity defining at least part of the third path are determined based on collision constraints.

8. The system of claim 6, wherein the one or more physical processors are configured by computer-readable instructions such that a location of first game entity defining at least part of the second path and a location of the second game entity defining at least part of the third path are determined based on respective threshold distances from a location of the first group entity along the first path.

9. The system of claim 6, wherein the one or more physical processors are configured by computer-readable instructions such that the second path is maintained a threshold distance from the third path.

10. The system of claim 1, wherein the one or more physical processors are configured by computer-readable instructions such that the group entities are not visible to the users.

11. A method to control groups of game entities in a video game, the method being implemented in a computer system including one or more physical processors and storage media storing machine-readable instructions, the method comprising:
  executing an instance of a video game, and implementing the instance of the video game to facilitate user participation in the video game, the video game taking place in a virtual space, wherein user participation in the video game includes controlling groups of game entities in the virtual space;
  forming the groups of game entities and associating the individual groups with individual group entities, the individual game entities being discrete virtual objects within the virtual space, the individual group entities being discrete virtual objects within the virtual space that are separate and distinct from the individual game entities, the groups including a first group that includes a first game entity and a second game entity, wherein the first group is associated with a first group entity;
  receiving control inputs to directly control individual group entities, the control inputs causing the individual group entities to perform individual group entity actions in the virtual space in direct response to the control inputs, the individual group entity actions causing the game entities included in the corresponding groups to perform one or more group actions in a collective, coordinated, and/or collaborative manner in response to the corresponding individual group entity actions, such that:
    receiving a first control input to directly control the first group entity causes the first group entity to perform a first group entity action in direct response to the first control input, and
    the first group entity action causes the game entities included in the first group to perform a first group action in a first collective, coordinated, and/or collaborative manner in response to the first group entity action; and
  implementing the received control inputs by effectuating the individual group entity actions of the individual group entities and the individual group actions of the game entities included in the individual groups in the collective, coordinated, and/or collaborative manner, wherein effectuating the group actions of the game entities included in the individual groups in the collective, coordinated, and/or collaborative manner includes effectuating individual game entity actions to be performed by the individual game entities included in the corresponding individual groups in response to the corresponding individual group entity actions, such that implementing the first control input causes:
    the first group entity to perform the first group entity action in response to the first control input; and
    the game entities included in the first group to perform the first group action in the first collective, coordinated, and/or collaborative manner in response to the first group entity action by the first group entity;
  wherein performing the first group action includes executing a first game entity action by the first game entity, and a second game entity action by the second game entity.

12. The method of claim 11, wherein the control inputs are determined based on entry and/or selection from users through client computing platforms used to access the virtual space, such that the first control input is determined based on entry and/or selection from a first user through a first client computing platform.

13. The method of claim 11, wherein the control inputs are determined automatically.

14. The method of claim 11, wherein the first game entity action and the second game entity action are responsive to the first group entity action.

15. The method of claim 11, wherein the one or more group actions include navigating the individual game entities included in the corresponding individual groups through the topography of the virtual space in a collective, coordinated, and/or collaborative manner, wherein the first group entity action corresponds to navigating the first group entity along a first path through the topography such that the first group action corresponds to navigating the first group along the first path in a collective, coordinated, and/or collaborative manner.

16. The method of claim 15, wherein implementing the first game entity action includes executing a navigation of the first game entity along a second path and the second game entity action includes executing a navigation of the second game entity along a third path, wherein the second path and third path are determined based on, and responsive to, the first path.

17. The method of claim 16, wherein a location of first game entity defining at least part of the second path and a location of the second game entity defining at least part of the third path are determined based on collision constraints.

18. The method of claim 16, wherein a location of first game entity defining at least part of the second path and a location of the second game entity defining at least part of the third path are determined based on respective threshold distances from a location of the first group entity along the first path.

19. The method of claim 16, wherein the second path is maintained a threshold distance from the third path.

20. The method of claim 11, wherein the group entities are not visible to the users.

* * * * *